Dec. 2, 1952　　　W. HENSON　　　2,619,755
COLLAPSIBLE LANDING NET
Filed Jan. 24, 1948

WILLIAM HENSON
INVENTOR

BY *Herbert J. Brown*
ATTORNEY

Patented Dec. 2, 1952

2,619,755

UNITED STATES PATENT OFFICE 2,619,755

COLLAPSIBLE LANDING NET

William Henson, Fort Worth, Tex., assignor of one-half to Clifford H. White, Fort Worth, Tex.

Application January 24, 1948, Serial No. 4,112

1 Claim. (Cl. 43—12)

This invention relates to fishing equipment and has reference to a net for landing fish. Particularly, the present invention has to do with collapsible landing nets whereby the same may be conveniently carried and transported when not in use.

I am aware that collapsible landing nets have been made heretofore, but such nets were unhandy in their use as compared with the present invention, particularly when they were carried in their closed position and had to be opened quickly to land a fish.

An object of the invention is to provide an arrangement and construction for a collapsible landing net which may be easily operated with one hand while landing a fish with the other hand.

Another object of the invention is to provide a relatively simple and economical construction for collapsible landing nets.

A further object of the invention is to provide a collapsible landing net which may be worn on the user's belt and operated therefrom by using one hand only.

These and other objects will become apparent from the following description of the accompanying drawing, wherein.

The form of the invention shown includes a tubular handle 1 having a closed end 2 and a hook 3 secured, as by spot welding, to the surface of the said handle near the closed end. It will be noted that the projecting end of the hook is directed toward the length of the handle 1. The end of the handle 1, opposite the closed end 2, is open, as at a.

Figure 1:
Figure 1 illustrates the present landing net in its closed position and carried by a fisherman.
Figure 3:
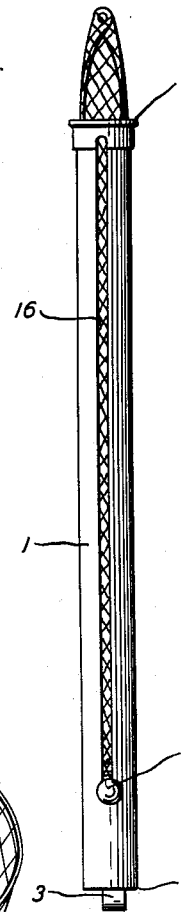
Figure 3 is an elevational view of the invention in its closed position.
Figure 5:
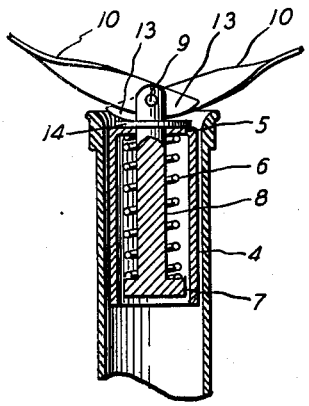
Figure 5 is an axial sectional view through a part of the handle of the landing net and showing the means employed for maintaining the net in its opened position.
Figure 6:
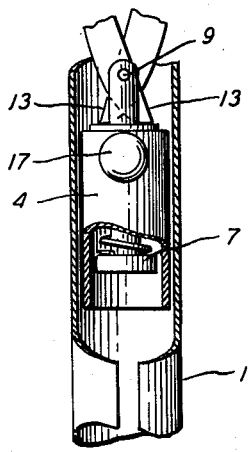
Figure 6 is a sectional view similar to Figure 5, but showing the frame or hoop of the invention in its collapsed or closed position as when received within the tubular handle.
Figure 2:
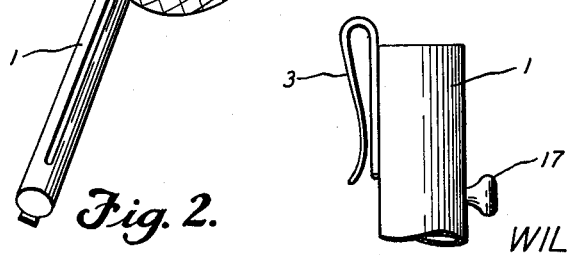
Figure 2 is a perspective view of the landing net illustrated in Figure 1, but showing the same in its opened or extended position.
Figure 4:
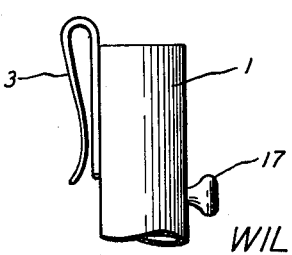
Figure 4 is a broken elevational view of one end of the landing net and showing the belt hook secured thereon, and also showing the relative position of the actuating knob when the net is in its closed or collapsed position.

Within the handle 1 there is a slidable tubular guide member 4 having a closed end 5 toward the open end a of the handle. Within the tubular guide member 4 there is a coil spring 6, one end of which bears against the closed end 5 of the guide member, whereas the other end of the spring bears against an annular shoulder 7 which is integral with the end of a pin 8 slidably disposed through the center of the referred to closed end 5. The outer end of the pin 8 is provided with a pivot pin 9 laterally positioned therethrough for pivotally engaging the ends of a pair of spring metal straps 10 which form a hoop 11, as shown in Figure 2. The outer ends of the straps 10 are pivotally joined by another pivot pin 12. The straps 10 are slightly bowed so that they will tend to form the hoop 11 referred to when extended beyond the handle 1. Both straps 10 are turned at each end so as to accommodate the pivot pins 9 and 12 which join the same at their respective inner and outer ends. The inner ends of the straps 10 are provided with integral fingers 13 which bear against a washer 14 positioned on the central pin 8 and against the closed end 5 of the tubular guide 4. A net 15 is fastened to the hoop 11.

A longitudinal slot 16 is formed in the wall of the tubular handle 1 and accommodates a projecting knob or projection 17 which is secured to the guide member 4.

When fishing, the described assembly may be carried on the user's belt by means of the hook 3, and when so positioned the opened end a of the handle 1 is downwardly directed and the knob 17 is near the said supporting hook. By pressing the knob 17 downwardly the folded straps are extended and, by reason of the spring action, the hoop 11 is formed when thus extended. The extended assembly is then removed from the belt and used in the usual manner. The cams 13 acting upon the washer 14 further maintain the hoop 11 in its opened position. After using the net 15, the hoop 11 and net 15 may be replaced in the tubular handle 1 by applying pressure to the straps 10 and pressing the same inwardly through the opened end a of the handle.

The described form of the invention is not restrictive, but may be made in many ways within the scope of the appended claim.

What is claimed is:

A collapsible landing net comprising a tubular handle having an open end, a tubular guide member slidably received within said handle and having a closed end directed toward said open end of said handle, a pin slidably positioned through said closed end of said guide member and having a shoulder thereon received within said guide member, a compression spring positioned around said pin and bearing against said shoulder and said closed end of said tubular guide member, arcuate spring straps pivotally connected with each other on corresponding ends thereof and arcuate fingers on the remaining ends thereof, said fingers being arranged to cross each other and pivotally connected with said pin at their point of intersection, said fingers having their arcuate sides in contact with the outer surface of said closed end of said tubular guide member, a landing net having the periphery thereof connected with and supported by said spring straps, said tubular handle having a longitudinal slot extending substantially the full length thereof, a projecting knob secured to said tubular guide member and extending outwardly through said longitudinal slot in said tubular handle, and a looped hook having one side thereof rigidly secured to said tubular handle on the end of the latter opposite said open end and on the side thereof opposite said longitudinal slot, the loop of said hook being remotely positioned relative to the open end of said handle.

WILLIAM HENSON.

REFERENCES CITED

The following references are of record in the file of this patent:

UNITED STATES PATENTS

| Number | Name | Date |
|---|---|---|
| 440,568 | Hebard | Nov. 11, 1890 |
| 1,513,990 | Higginbotham et al. | Nov. 4, 1924 |
| 2,124,952 | Norris et al. | July 26, 1938 |

FOREIGN PATENTS

| Number | Country | Date |
|---|---|---|
| 23,093 | Great Britain | 1911 |
| 251,462 | Great Britain | May 6, 1926 |